US012000590B1

(12) United States Patent
Unton

(10) Patent No.: US 12,000,590 B1
(45) Date of Patent: Jun. 4, 2024

(54) ENGINE WITH PRESSURE GAIN COMBUSTOR AND COMPRESSOR DISCHARGE TURBINE COOLING

(71) Applicant: Rolls-Royce North American Technologies Inc., Indianapolis, IN (US)

(72) Inventor: Timothy Unton, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/228,644

(22) Filed: Jul. 31, 2023

(51) Int. Cl.
*F23R 7/00* (2006.01)
*F01D 9/06* (2006.01)

(52) U.S. Cl.
CPC ................ *F23R 7/00* (2013.01); *F01D 9/065* (2013.01); *F05D 2240/35* (2013.01)

(58) Field of Classification Search
CPC ..... F01D 9/02; F01D 9/04; F01D 9/06; F01D 9/065; F02C 6/08; F23R 3/02; F23R 3/04; F23R 3/50; F23R 3/52; F23R 3/58; F23R 7/00
See application file for complete search history.

(56) References Cited

U.S. PATENT DOCUMENTS 4,912,924 A 4/1990 Stockwell
5,253,589 A 10/1993 Kawanishi
5,894,719 A 4/1999 Malim
5,916,125 A 6/1999 Snyder
6,351,934 B2 3/2002 Snyder
7,137,243 B2 11/2006 Snyder
9,777,627 B2 10/2017 Snyder
10,393,016 B2 8/2019 Hill
2010/0199684 A1* 8/2010 Rice .......................... F23R 3/60 29/888

OTHER PUBLICATIONS

Fundamentals of Heat Exchanger Design, Ramesh K. Shah and Dusan P. Sekulic, 2003, pp. 848-852.

* cited by examiner

*Primary Examiner* — Scott J Walthour

(74) *Attorney, Agent, or Firm* — Barnes & Thornburg LLP

(57) ABSTRACT

A gas turbine engine including a compressor, a pressure-gain combustor, and a turbine is disclosed. The compressor compresses air drawn into the engine and delivers high pressure air to the pressure-gain combustor. In the pressure-gain combustor, fuel is mixed with the high pressure air and is ignited. Products of the combustion reaction in the pressure-gain combustor are directed into the turbine at a pressure greater than that of the air discharged by the compressor. In the turbine, work is extracted by actively cooled turbine blades to drive the compressor and, sometimes, an output shaft. In illustrated designs, some compressed air from the compressor is diverted around combustion in the combustor to provide active cooling for the turbine blades.

16 Claims, 4 Drawing Sheets

ENGINE WITH PRESSURE GAIN COMBUSTOR AND COMPRESSOR DISCHARGE TURBINE COOLING

FIELD OF THE DISCLOSURE

The present disclosure relates generally to engines with rotating detonation combustion, and more specifically to actively cooled systems within the engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Rotating detonation combustors and other pressure-gain combustors designed for use in gas turbine engines can offer increased fuel efficiency and more compact systems over conventional deflagration-based combustors. Part of the gain in efficiency is due to a pressure rise occurring across the combustor rather than a pressure drop. From a fundamental cycle thermodynamics perspective, the pressure rise is desirable, but it presents a problem for turbines that receive products of the combustion reaction to extract mechanical energy.

Modern turbines operate at temperatures above their melting point by using cooling air that is fed through the blades and vanes of the turbine system. The cooling air is taken from the compressor, typically prior to discharge into the combustor. The cooling air is able to be driven through the blades and vanes of the turbine system because the pressure drop across typical combustors lowers pressure in the flow path of the turbine system. If the pressure increases across the combustor, as can be the case in rotating detonation combustors, the cooling air can no longer be forced through the turbine blades and vanes due to an adverse pressure gradient.

SUMMARY

The present disclosure may comprise one or more of the following features and combinations thereof.

A gas turbine engine may comprise a compressor, a rotating detonation combustor, and a turbine system. The compressor may include at least one compressor rotor with a compressor blade configured to compress air drawn into the engine upon rotation of the compressor rotor. The rotating detonation combustor may be arranged around a reference axis. The rotating detonation combustor may include a combustion chamber and an inlet splitter. The inlet splitter may be fluidly coupled to the compressor to receive compressed air from the compressor and to the combustion chamber. The rotating detonation combustor may be configured to mix fuel with the compressed air in the combustion chamber, ignite the mixed fuel and the compressed air in the combustion chamber, and to discharge products of the combustion reaction between the mixed fuel and the compressed air at a discharge pressure greater than an inlet pressure of the compressed air received from the compressor.

In some embodiments, the turbine system may define a flow path across which static vanes and rotating blades extend. The flow path may be fluidly coupled to the rotating detonation combustor so as to receive products of the combustion reaction from the rotating detonation combustor. The static vanes and rotating blades may be formed to include cooling air passageways shaped to carry cooling air therethrough to lower the temperature of the associated static vanes and rotating blades.

In some embodiments, the inlet splitter of the rotating detonation combustor may be shaped to include a combustion passageway and a bypass passageway. The combustion passageway may fluidly couple the compressor with the combustion chamber. The bypass passageway may be separated from the combustion chamber and may fluidly couple the compressor with the cooling air passageways formed in the static vanes and rotating blades.

In some embodiments, the inlet splitter may include an annular ring separating the combustion passageway from the bypass passageway. The inlet splitter may include combustion airfoils arranged across the combustion passageway and bypass airfoils arranged across the bypass passageway. The number of combustion airfoils may be different from the number of bypass airfoils. The bypass airfoils may be shaped to increase static pressure downstream of the inlet splitter more than the combustion airfoils.

In some embodiments, the bypass passageway may include (i) a radially-inner portion that is shaped to fluidly couple the compressor with radially-inwardly facing openings into the cooling air passageways formed in at least one of the static vanes and rotating blades, and (ii) a radially-outer portion that is shaped to interconnect the compressor with radially-outwardly facing openings into the cooling air passageways formed in at least one of the static vanes and rotating blades. The inlet splitter may include an inner ring that separates the combustion passageway from the radially-inner portion of the bypass passageway and an outer ring that separates the combustion passageway from the radially-outer portion of the bypass passageway.

In some embodiments, the compressor may include a compressor airfoil upstream of the inlet splitter of the rotating detonation combustor. The compressor airfoil may have a combustor portion upstream of the combustor passageway shaped to compress air directed to the combustor passageway and a bypass portion shaped to compress air directed to the bypass passageway. The bypass portion of the compressor airfoil may be shaped to increase pressure of compressed air directed to the bypass passageway more than the combustor portion of the compressor airfoil.

In some embodiments, the combustor passageway of the inlet splitter included in the rotating detonation combustor may be annular. The bypass passageway of the inlet splitter included in the rotating detonation combustor may be annular. The bypass passageway may be radially separated from the combustor passageway.

In some embodiments, the bypass passageway of the inlet splitter may be radially inward of the combustor passageway. The bypass passageway of the inlet splitter may be radially outward of the combustor passageway.

According to another aspect of the present disclosure, a gas turbine engine may comprise a compressor, a turbine system, and a pressure-gain combustor. The compressor may be configured to compress air drawn into the engine. The turbine system may include static vanes and rotating blades formed to include cooling air passageways. The pressure-gain combustor may be fluidly coupled between the compressor and the turbine system. The pressure-gain combustor may include a combustion chamber and an inlet splitter. The inlet splitter of the pressure-gain combustor may be shaped to include a combustion passageway and a bypass passageway. The combustion passageway may fluidly couple the compressor with the combustion chamber. The bypass passageway may fluidly couple the compressor with the cooling air passageways formed in the static vanes and rotating blades included in the turbine system.

In some embodiments, the inlet splitter of the pressure-gain combustor may include a wall that separates the combustion passageway from the bypass passageway. The wall may comprise an annular ring separating the combustion passageway from the bypass passageway.

In some embodiments, the inlet splitter may include combustion airfoils arranged across the combustion passageway and bypass airfoils arranged across the bypass passageway. The number of combustion airfoils may be different from the number of bypass airfoils. The bypass airfoils may be shaped to increase static pressure downstream of the inlet splitter more than the combustion airfoils.

According to another aspect of the present disclosure, a pressure-gain combustor configured to discharge products of a combustion reaction therein at a pressure greater than that of compressed air supplied to the combustion reaction may comprise a combustion chamber and an inlet splitter. The inlet splitter may be shaped to include a combustion passageway in fluid communication with the combustion chamber and a bypass passageway in fluid communication with a bypass space around the combustion chamber.

In some embodiments, the inlet splitter may include an annular ring separating the combustion passageway from the bypass passageway. The inlet splitter may include combustion airfoils arranged across the combustion passageway and bypass airfoils arranged across the bypass passageway. The bypass airfoils may be shaped to increase static pressure downstream of the inlet splitter more than the combustion airfoils.

These and other features of the present disclosure will become more apparent from the following description of the illustrative embodiments.

DETAILED DESCRIPTION OF THE DRAWINGS

Figure 1:
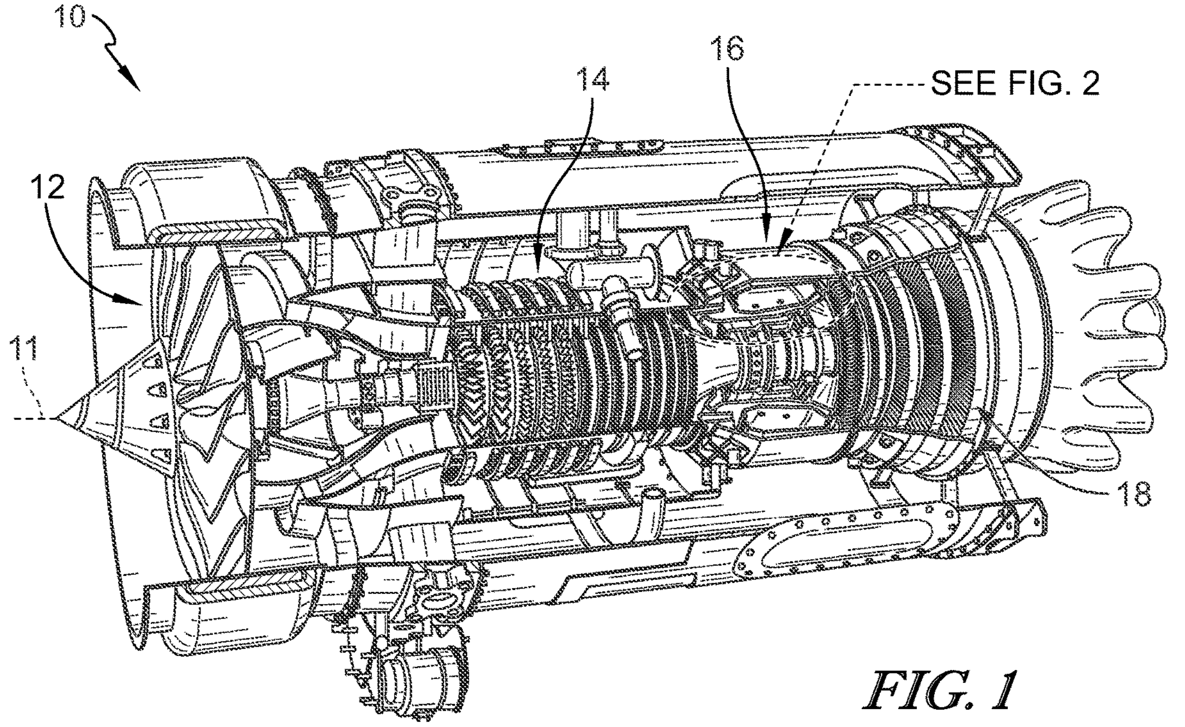
FIG. 1 is a perspective view of an exemplary turbofan gas turbine engine that is cut away to show a fan, a compressor, a rotating detonation pressure-gain combustor, and a turbine system that drives the fan and the compressor during operation of the engine.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16 located downstream of the compressor 14, and a turbine system 18 located downstream of the rotating detonation pressure-gain combustor 16 as shown in FIG. 1. The fan 12 is driven by the turbine system 18 and provides thrust for propelling the gas turbine engine 10. The compressor 14 compresses and delivers high pressure air to the combustor 16 and to the turbine system 18 for cooling. The combustor 16 mixes fuel with the compressed air received from the compressor 14 and ignites the fuel. The hot, high-pressure products of the combustion reaction in the combustor 16 are directed into the turbine system 18 to cause the turbine system 18 to rotate about a central axis 11 and drive the compressor 14 and the fan 12.

Figure 2:
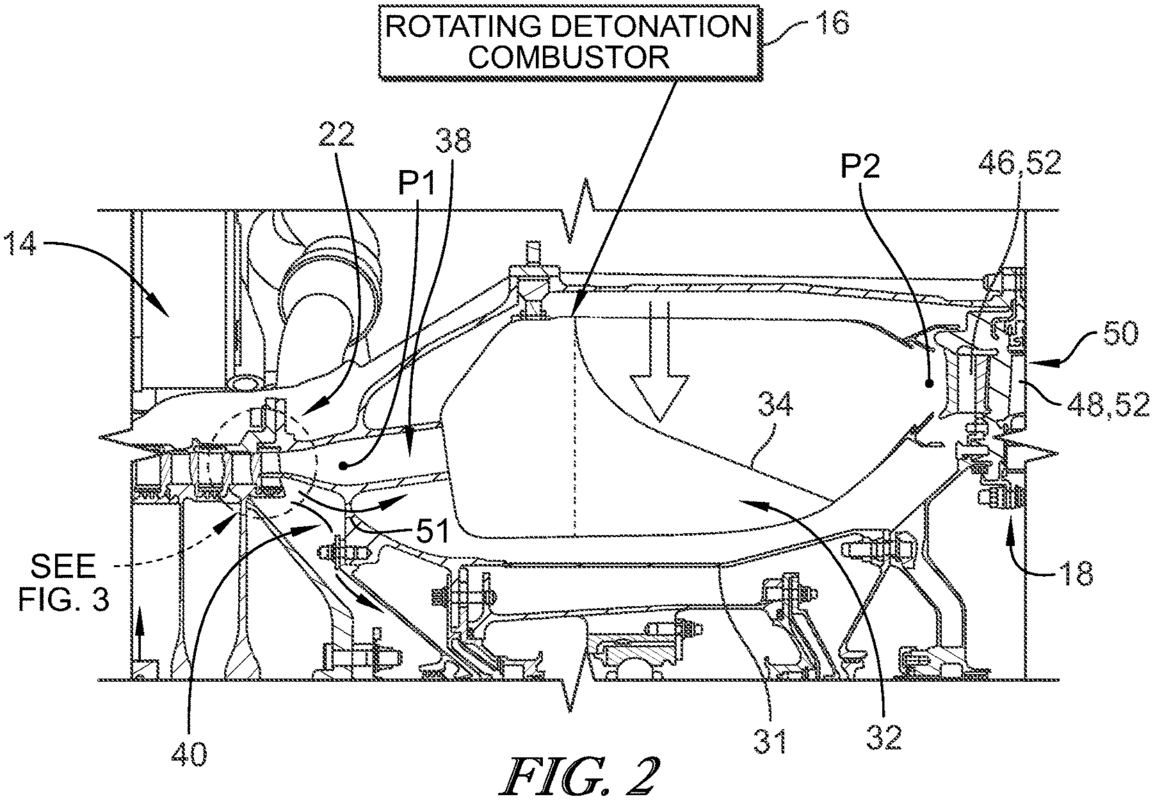
FIG. 2 is a cross-sectional view of a portion of the engine in FIG. 1 showing that the rotating detonation pressure-gain combustor includes (1) a combustion chamber in which fuel is injected and ignited in such a way as to induce a rotating detonation wave such that the pressure $P_2$ exiting the combustor is greater than the pressure $P_1$ entering the combustor and (2) an inlet splitter configured to divide compressed air from the compressor into a first stream that enters the combustion chamber and a second stream radially-inward of the first stream that bypasses the combustion chamber to be used for cooling components of the turbine system as suggested in FIG. 3.
Figure 3:
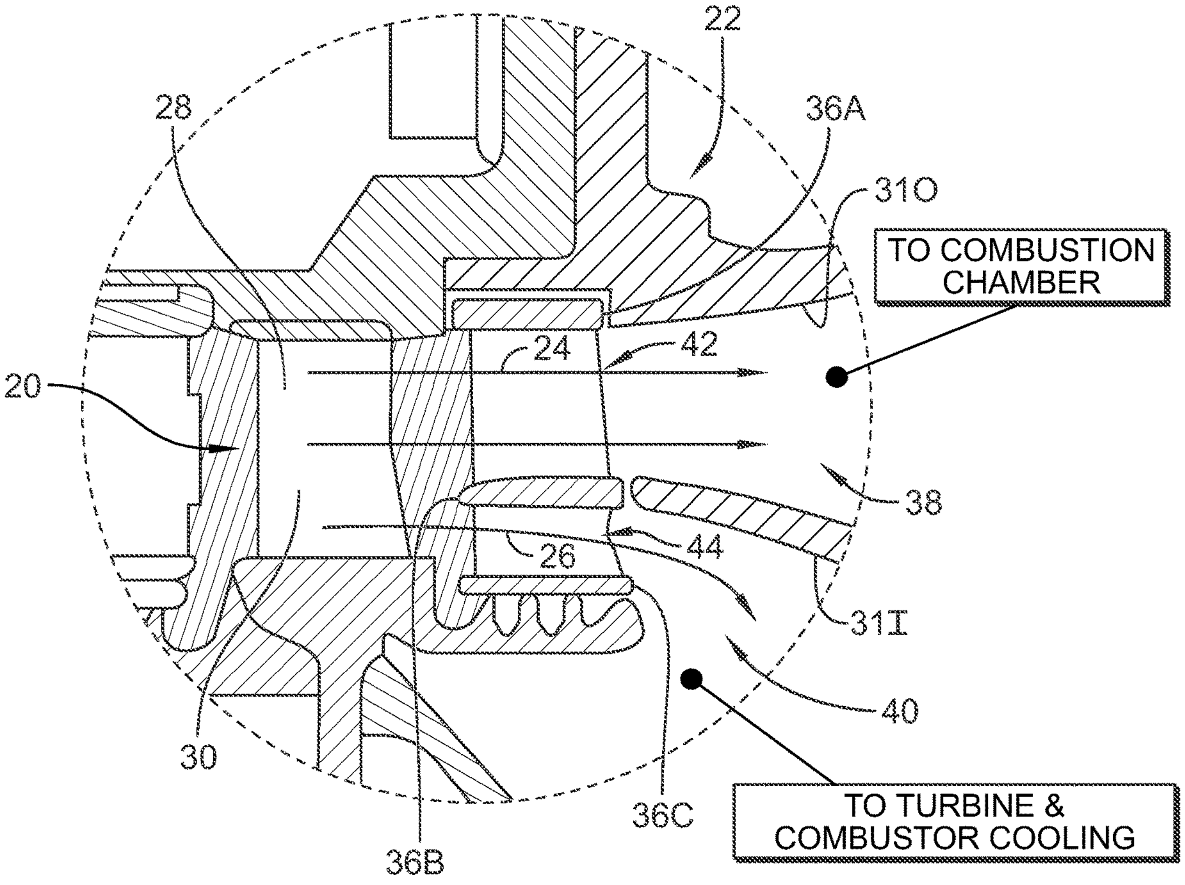
FIG. 3 is a detailed cross-sectional view of a portion of FIG. 2 showing that the inlet splitter of the rotating detonation pressure-gain combustor includes annular rings that define a combustion passageway that provides fluid communication to the combustion chamber and a bypass passageway radially inward of the combustion passageway that provides fluid communication to the turbine system for turbine component cooling air.

In the illustrative embodiment, the combustor 16 is a rotating detonation combustor that drives a pressure gain from its inlet having a first pressure $P_1$ to its outlet having a second pressure $P_2$ as suggested in FIG. 2. Cooling air flows, like bypass flow 26 shown in FIG. 3, are split off from discharge air exiting the compressor 14 toward the combustor 16 and are used in cooling components of the turbine system 18. The bypass flow 26 is pressure managed by the compressor 14 and combustor 16 components to allow the flow 26 to overcome the relatively high-pressure exiting the combustor 16 that interfaces with the turbine system 18.

The compressor 14 includes at least one compressor rotor having compressor blades 20 coupled with the compressor rotor as shown in FIG. 3. The compressor 14 compresses air drawn into the gas turbine engine 10 upon rotation of the at least one compressor rotor and the at least one compressor blade 20 about the axis 11. The compressor 14 delivers some of the high pressure air to the pressure-gain combustor 16 fluidly downstream of the compressor 14, while delivering the remaining pressurized air to the turbine system 18 fluidly downstream of the compressor 14.

The rotating detonation pressure-gain combustor 16 is arranged around the axis 11 and coupled axially between the compressor 14 and the turbine system 18 as shown in FIGS. 1 and 2. The rotating detonation pressure-gain combustor 16 receives the high pressure air from the compressor 14 at a first pressure $P_1$, which may also be referred to as an inlet pressure $P_1$. The rotating detonation pressure-gain combustor 16 is configured to discharge the products of the combustion reaction that takes place within the combustor 16 at a second pressure $P_2$, which may also be referred to as a discharge pressure $P_2$, greater than that of the first pressure $P_1$. Thus, a pressure gain occurs across the rotating detonation pressure-gain combustor 16.

In traditional designs, a combustor included in a gas turbine engine may experience a pressure drop across the combustor. Due to the pressure drop, cooling air can be forced into a flow path of the turbine system downstream of the combustor to cool components of the turbine system. However, the rotating detonation pressure-gain combustor 16 experiences a pressure gain across the combustor 16. Because of the pressure gain across the rotating detonation pressure-gain combustor 16, cooling air may not be forced into the flow path of the turbine system 18 due to the adverse pressure gradient.

As such, to deliver cooling air to the turbine system 18, the rotating detonation pressure-gain combustor 16 includes an inlet splitter 22 configured to divide the compressed air from the compressor 14 into a first stream 24 that enters the combustor 16 and a second stream 26 that bypasses the combustor 16 as shown in FIG. 3. The second stream 26 is delivered to the turbine system 18 to cool various components of the turbine system 18 such that the relatively high pressure discharged from the combustor 16 to the turbine system 18 does not prevent cooling air from reaching the turbine system 18.

Though shown and described illustratively as a rotating detonation pressure-gain combustor 16, the combustor 16 may be any combustor configured to have a pressure gain across the combustor. For example, wave rotor combustors, ram jet combustors, pulsed detonation combustors, resonant pulse combustors, and other suitable combustors can discharge combustion products at pressures greater than the combustor inlet pressure. Such other pressure gain combustors, or even other traditional non-pressure gain combustors, may be implemented in place of the illustrated combustor 16 while remaining within the spirit of this disclosure.

Turning back to the illustrative compressor 14, the compressor blades 20 are arranged upstream of the inlet splitter 22 of the combustor 16 as shown in FIG. 3. The compressor blade 20 is formed to include a combustor portion 28 and a bypass portion 30. The combustor portion 28 is radially outward of the bypass portion 30. The combustor portion 28 is shaped to compress the air of the first stream 24 that is directed into the combustor 16. The bypass portion 30 is shaped to compress the air of the second stream 26 that is directed around the combustor 16. The shape of the bypass portion 30 of the compressor blade 20 increases the pressure of the second stream 26 directed around the combustor 16 more than the shape of the combustor portion 28 of the compressor blade 20.

The pressure of the second stream 26 that bypasses the combustor 16 is higher than the first pressure $P_1$ of the first stream 24 that enters the combustor 16. Thus, there is a higher compressor ratio at the bypass portion 30 of the compressor blade 20 compared to the compressor ratio at the combustor portion 28 of the compressor blade 20. The differing compressor ratios may be achieved through twist and camber distribution of the compressor blade 20. In the illustrative embodiment, the compressor blade 20 is arranged in the most axially aft rotor stage of the compressor 14.

The rotating detonation pressure-gain combustor 16 includes the inlet splitter 22 arranged downstream of the compressor blade 20, a combustor outer shell 31, and a combustion chamber 32 located downstream of the inlet splitter 22 as shown in FIGS. 2 and 3. The inlet splitter 22 is fluidly coupled to the compressor 14 to receive the compressed air. The combustor outer shell 31 extends circumferentially around the axis 11 and contains the combustion chamber 32 therein. The combustion chamber 32 is in fluid communication with the compressor 14 through the inlet splitter 22 to receive the compressed air (i.e., the first stream 24). Fuel is injected into the combustion chamber 32, mixed with the first stream 24 of the compressed air, and ignited within the combustion chamber 32 so as to induce a rotating detonation wave 34 in the combustion chamber 32 as suggested in FIG. 2.

The rotating detonation wave 34 is constrained within the combustion chamber 32 such that the wave 34 propagates circumferentially around the combustion chamber 32. The products of the combustion reaction in the combustion chamber 32 are discharged from the combustion chamber 32 at the second pressure $P_2$, which is greater than the first pressure $P_1$. The pressure gain across the combustion chamber 32 is a result of the detonation process.

Because the inlet splitter 22 divides the compressed air into the first stream 24 and the second stream 26, only the first stream 24 is subject to the combustion reaction in the combustion chamber 32. Thus, the second stream 26 that bypasses the combustor 16 has a lower temperature than that of the first stream 24. As such, the second stream 26 provides cooling to components of the turbine system 18 as the first stream 24 may heat the components of the turbine system 18.

The inlet splitter 22 includes annular rings 36 arranged circumferentially around the central axis 11 as shown in FIG. 3. The inlet splitter 22 may also be referred to as a compressor discharge vane 22. The annular rings 36 divide the compressed air from the compressor 14 into the first stream 24 and the second stream 26. The first stream 24 flows through a combustor passageway 38 and into the combustion chamber 32. The second stream 26 flows through a bypass passageway 40 to bypass the combustion chamber 32 and reach the turbine system 18. The bypass passageway 40 is arranged radially inward of the combustor passageway 38. As such, the first stream 24 flows radially outward of the second stream 26.

The annular rings 36 of the inlet splitter 22 include a first annular ring 36A, a second annular ring 36B, and a third annular ring 36C as shown in FIG. 3. The first annular ring 36A is arranged radially outward of the second annular ring 36B, and the second annular ring 36B is arranged radially outward of the third annular ring 36C. The first annular ring 36A is radially aligned with a radially-outward portion 31O of the combustor outer shell 31 as shown in FIG. 3. The second annular ring 36B is radially aligned with a radially-inward portion 31I of the combustor outer shell 31.

The first stream 24 flows radially between the first annular ring 36A and the second annular ring 36B as shown in FIG. 3. The first annular ring 36A and the radially-outward portion 31O of the combustor outer shell 31 define at least a portion of a radial outer boundary of the combustor passageway 38. The second annular ring 36B and the radially-inward portion 31I of the combustor outer shell 31 define at least a portion of a radial inner boundary of the combustor passageway 38.

The second stream 26 flows radially between the second annular ring 36B and the third annular ring 36C as shown in FIG. 3. The second annular ring 36B and the radially-inward portion 31I of the combustor outer shell 31 define at least a portion of a radial outer boundary of the bypass passageway 40.

The second annular ring 36B separates the combustor passageway 38 and the bypass passageway 40 from one another such that the first stream 24 flows radially outward of the second annular ring 36B and the second stream 26 flows radially inward of the second annular ring 36B as shown in FIG. 3. In some embodiments, there may be more annular rings 36. In some embodiments, there may be less annular rings 36. For example, some of the annular rings 36 may be integrally formed with other components of the gas turbine engine 10. In the illustrative embodiment, each annular ring 36 is a discrete and monolithic component extending entirely circumferentially about the central axis 11.

The combustor passageway 38 fluidly couples the compressor 14 with the combustion chamber 32 as shown in FIG. 2. The first stream 24 passes over the combustor portion 28 of the compressor blade 20, between the first annular ring 36A and the second annular ring 36B, through the combustor passageway 38, and into the combustion chamber 32 of the combustor 16. The bypass passageway 40 fluidly couples the compressor 14 with the turbine system 18 to deliver the second stream 26 to the turbine system 18 for cooling of components in the turbine system 18. The second stream 26 passes over the bypass portion 30 of the compressor blade 20, between the second annular ring 36B and the third annular ring 36C, through the bypass passageway 40, and into the turbine system 18.

The combustor passageway 38 is arranged radially outward of the bypass passageway 40 as shown in FIG. 3. In the illustrative embodiment, the combustor passageway 38 and the bypass passageway 40 are both annular.

In some embodiments, the combustor outer shell 31 is formed, for example, in the radially-inward portion 31I of the combustor outer shell 31, to include combustor liner cooling passages 51 extending therethrough as shown in FIG. 2. A portion of the second stream 26 flowing through the bypass passageway 40 may flow through the combustor liner cooling passages 51 to cool walls of a combustor liner.

The illustrative inlet splitter of the combustor 16 includes combustion vanes 42 and bypass vanes as shown in FIG. 3. The combustion vanes 42 are arranged across the combustor passageway 38. The bypass vanes 44 are arranged across the bypass passageway 40. The combustion vanes 42 and the bypass vanes 44 help to direct the first stream 24 and the second stream 26 through the combustor passageway 38 and the bypass passageway 40, respectively.

In the illustrative embodiment, a number of combustion vanes 42 is different than a number of bypass vanes 44. In some embodiments, the number of combustion vanes 42 is greater than the number of bypass vanes 44. In some embodiments, the number of combustion vanes 42 is less than the number of bypass vanes 44. In some embodiments, the number of combustion vanes 42 may be the same as the number of bypass vanes 44.

A shape of the bypass vanes 44 is different than a shape of the combustion vanes 42 such that a static pressure downstream of the inlet splitter 22 in the bypass passageway 40 is increased more than a static pressure downstream of the inlet splitter 22 in the combustor passageway 38. In some embodiments, the shape of the bypass vanes 44 may be the same as the shape of the combustion vanes 42.

The bypass vanes 44 are configured to convert extra energy added by the bypass portion 30 of the compressor blade 20 into a higher static pressure than the combustion vanes 42. The bypass portion 30 of the compressor blade 20 and the bypass vanes 44 cause a greater pressure gain in the second stream 26 than that in the first stream 24. Thus, a pressure of the second stream 26 downstream of the bypass vanes 44 may be greater than the second pressure $P_2$ of the first stream 24 exiting the combustor 16.

The turbine system 18 is coupled with the combustor 16 downstream of the combustor 16 as shown in FIGS. 1 and 2. The turbine system 18 includes static vanes 46 and rotating blades 48 as shown in FIG. 2. The rotating blades 48 rotate about the axis 11 to drive the compressor 14 and the fan 12. The static vanes 46 and the rotating blades 48 extend across a turbine flow path 50 through which air flows.

The combustion chamber 32 is fluidly coupled with the turbine flow path 50 to deliver the first stream 24 that underwent the combustion reaction to the turbine flow path 50. The hot, high-pressure products of the combustion reaction included in the first stream 24 rotate the rotating blades 48 about the axis 11 to extract work to drive the compressor 14. The hot, high-pressure products of the combustion reaction increase a temperature of the static vanes 46 and rotating blades 48.

The static vanes 46 and the rotating blades 48 are both formed to include cooling air passageways 52 with radially-inwardly facing openings as suggested in FIG. 2. The bypass passageway 40 fluidly couples the compressor 14 with the radially-inwardly facing openings of the cooling air passageways 52 formed in each of the static vanes 46 and the rotating blades 48. The cooling air passageways 52 are shaped to carry cooling air, which includes the second stream 26, therethrough to lower the temperature of the static vanes 46 and the rotating blades 48. Thus, the first stream 24 including the hot, high-pressure products of the combustion reaction increases the temperature of the static vanes 46 and the rotating blades 48; and, the second stream 26 that bypasses the combustor 16 cools the static vanes 46 and the rotating blades 48 by passing through the cooling air passageways 52 formed in each of the static vanes 46 and the rotating blades 48.

In some embodiments, both the static vanes 46 and the rotating blades are formed to include cooling air passageways 52. In some embodiments, at least one of the static vanes 46 and the rotating blades are formed to include cooling air passageways 52.

As discussed, the gas turbine engine 10 in accordance with the disclosure is configured such that the last compressor rotor stage prior to the combustor 16 has a higher compressor ratio at the root 30 of the compressor blade 20 and a lower pressure ratio at the tip 28 of the compressor blade 20 via twist and camber distribution. The last compressor rotor stage is followed by a final compressor stator vane, illustratively considered part of the combustor 16 that is configured with an inlet splitter 22 and different vanes 42, 44 above and below the inlet splitter 22.

The vanes 44 of the inlet splitter 22 are configured to convert the extra energy added at the root 30 of the compressor blade 20 into higher static pressure than the vanes 42 above the inlet splitter 22. The lower vanes 44 feed the cooling air circuit while the upper vanes 42 feed the main combustor flow. The vanes 44 below the inlet splitter 22 may be of a different design than those above the inlet splitter 22 and may also have a different vane count. In this way, the compressor 14 adds extra work to the cooling flow such that its pressure rise is greater than the pressure rise from the tip 28 of the last compressor stage plus the pressure rise from the combustor 16.

Figure 4:
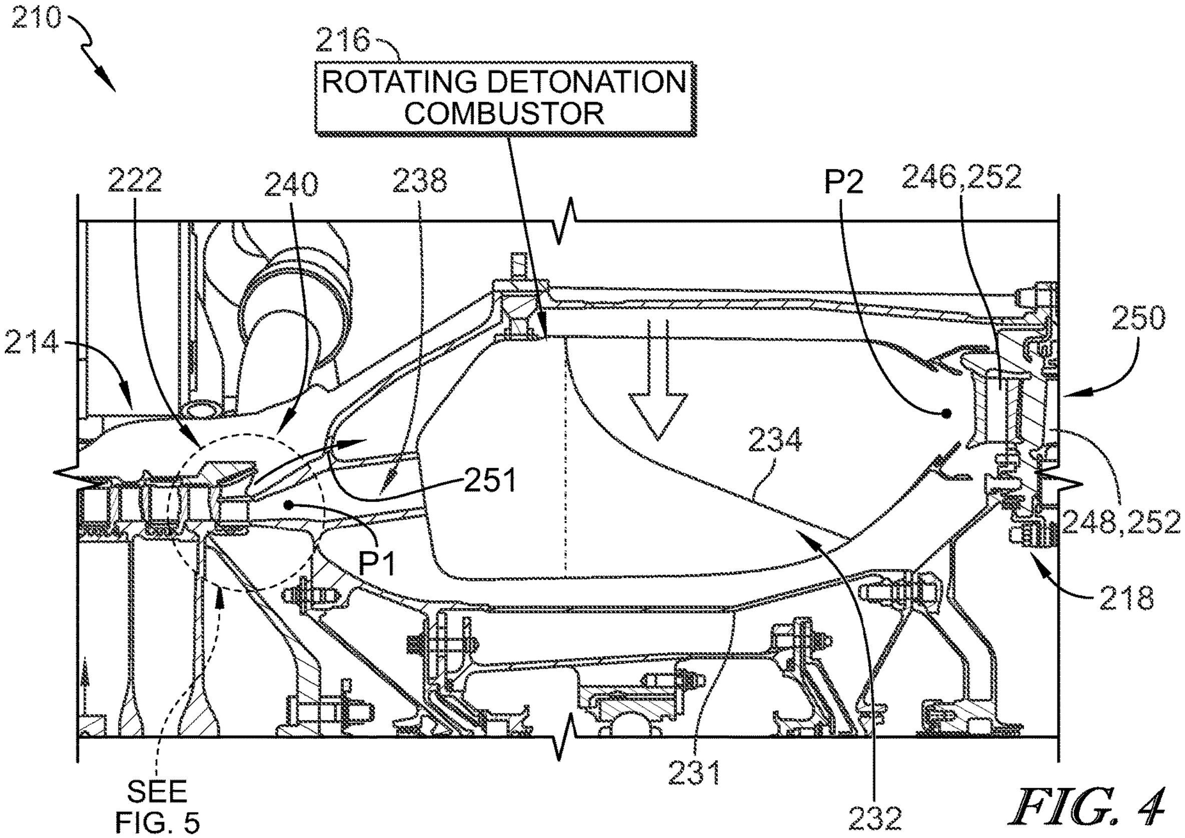
FIG. 4 is a cross-sectional view of a portion of an alternative engine showing that the rotating detonation pressure-gain combustor includes an inlet splitter configured to divide compressed air from the compressor into a first stream that enters the combustion chamber and a second stream radially-outward of the first stream that bypasses the combustion chamber to be used for cooling components of the turbine system as suggested in FIG. 5.
Figure 5:
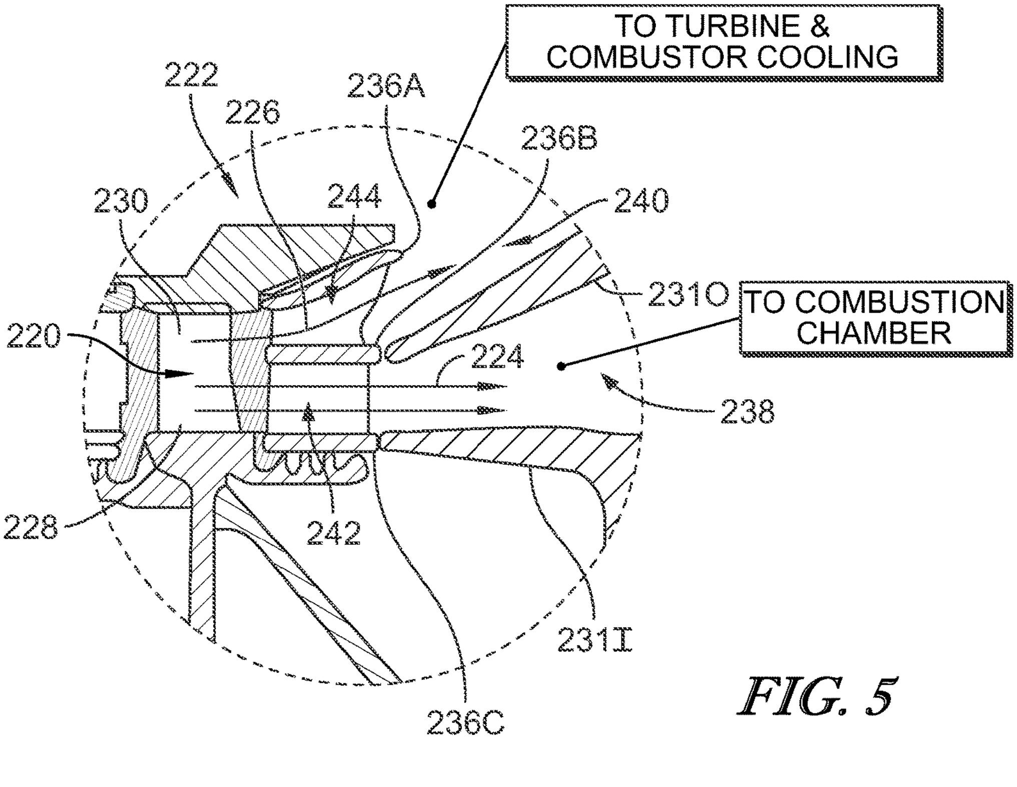
FIG. 5 is a detailed cross-sectional view of a portion of FIG. 4 showing that the inlet splitter of the rotating detonation pressure-gain combustor includes annular rings that define a combustion passageway that provides fluid communication to the combustion chamber and a bypass passageway radially outward of the combustion passageway that provides fluid communication to the turbine system for turbine component cooling air.

Another embodiment of a gas turbine engine 210 including a rotating detonation pressure-gain combustor 216 in accordance with the present disclosure is shown in FIGS. 4 and 5. The gas turbine engine 210 is substantially similar to the gas turbine engine 10 shown in FIGS. 1-3 and described herein. Accordingly, similar reference numbers in the 200 series indicate features that are common between the gas turbine engine 10 and the gas turbine engine 210. The description of the gas turbine engine 10 is incorporated by reference to apply to the gas turbine engine 210, except in instances when it conflicts with the specific description and the drawings of the gas turbine engine 210.

The gas turbine engine 210 includes a compressor 214, the rotating detonation pressure-gain combustor 216 located downstream of the compressor 214, and a turbine system 218 located downstream of the rotating detonation pressure-gain combustor 216 as shown in FIG. 4. The compressor 214 includes at least one compressor rotor with at least one compressor blade 220 coupled with the compressor rotor as shown in FIG. 5. The compressor blade 220 is formed to include a combustor portion 228 and a bypass portion 230.

The combustor portion 228 of the compressor blade 220 is radially inward of the bypass portion 230 of the compressor blade 220 as shown in FIG. 5. The combustor portion 228 is shaped to compress the air directed into the combustor 216. The bypass portion 230 is shaped to compress the air directed around the combustor 216. The shape of the bypass portion 230 of the compressor blade 220 increases the pressure of the second stream 226 of the compressed air directed around the combustor 216 more than the shape of the combustor portion 228 of the compressor blade 220. Thus, there is a higher compressor ratio at the bypass portion 230 of the compressor blade 220 compared to the compressor ratio at the combustor portion 228 of the compressor blade 220. The differing compressor ratios may be achieved through twist and camber distribution. In the illustrative embodiment, the compressor blade 220 is arranged in the most axially aft rotor stage of the compressor 214.

The rotating detonation pressure-gain combustor 216 includes an inlet splitter 222 arranged downstream of the compressor blade 220, a combustor outer shell 231, and a combustion chamber 232 located downstream of the inlet splitter 222 as shown in FIGS. 4 and 5. The inlet splitter 222 is fluidly coupled to the compressor 214 to receive the compressed. The combustion chamber 232 is in fluid communication with the compressor 214 through the inlet splitter 222 to receive the first stream 224. Fuel is injected into the combustion chamber 232, mixed with the first stream 224 of the compressed air, and ignited within the combustion chamber 232 so as to induce a rotating detonation wave 234 in the combustion chamber 232 as suggested in FIG. 4.

The inlet splitter 222 includes annular rings 236 arranged circumferentially around a central axis of the gas turbine engine 210 as shown in FIG. 4. The inlet splitter 222 may also be referred to as a compressor discharge vane 222. The annular rings 236 divide the compressed air from the compressor 214 into the first stream 224 and the second stream 226. The first stream 224 flows through a combustor passageway 238 and into the combustion chamber 232. The second stream 226 flows through a bypass passageway 240 to bypass the combustion chamber 232 and reach the turbine system 218. The bypass passageway 240 is arranged radially outward of the combustor passageway 238. As such, the first stream 224 flows radially inward of the second stream 226.

The annular rings 236 of the inlet splitter 222 include a first annular ring 236A, a second annular ring 236B, and a third annular ring 236C as shown in FIG. 5. The first annular ring 236A is arranged radially outward of the second annular ring 236B, and the second annular ring 236B is arranged radially outward of the third annular ring 236C. The second annular ring 236B is radially aligned with a radially-outward portion 231O of the combustor outer shell 231 as shown in FIG. 5. The third annular ring 236C is radially aligned with a radially-inward portion 231I of the combustor outer shell 231.

The first stream 224 flows radially between the second annular ring 236B and the third annular ring 236C as shown in FIG. 5. The second annular ring 236B and the radially-outward portion 231O of the combustor outer shell 231 define a radial outer boundary of the combustor passageway 238. The third annular ring 236C and the radially-inward portion 231I of the combustor outer shell 231 define a radial inner boundary of the combustor passageway 238.

The second stream 226 flows radially between the first annular ring 236A and the second annular ring 236B as shown in FIG. 5. The second annular ring 236B and the radially-outward portion 231O of the combustor outer shell 231 define a radial inner boundary of the bypass passageway 240.

The second annular ring 236B separates the combustor passageway 238 and the bypass passageway 240 from one another such that the first stream 224 flows radially inward of the second annular ring 236B and the second stream 226 flows radially outward of the second annular ring 236B as shown in FIG. 5.

The combustor passageway 238 fluidly couples the compressor 214 with the combustion chamber 232 as shown in FIG. 4. The first stream 224 passes over the combustor portion 228 of the compressor blade 220, between the second annular ring 236B and the third annular ring 236C, through the combustor passageway 238, and into the combustion chamber 232 of the combustor 216. The bypass passageway 240 fluidly couples the compressor 214 with the turbine system 218 to deliver the second stream 226 to the turbine system 218 for cooling of components in the turbine system 218. The second stream 226 passes over the bypass portion 230 of the compressor blade 220, between the first annular ring 236A and the second annular ring 236B, through the bypass passageway 240, and into the turbine system 218.

The combustor passageway 238 is arranged radially inward of the bypass passageway 240 as shown in FIG. 5. In the illustrative embodiment, the combustor passageway 238 and the bypass passageway 240 are both annular.

In some embodiments, the combustor outer shell 231 is formed, for example, in the radially-outward portion 231O of the combustor outer shell 231, to include combustor liner cooling passages 251 extending therethrough as shown in FIG. 4. A portion of the second stream 226 flowing through the bypass passageway 240 may flow through the combustor liner cooling passages 251 to cool walls of a combustor liner.

The combustor 216 includes combustion vanes 242 arranged across the combustor passageway 238 and bypass vanes 244 arranged across the bypass passageway 240 as shown in FIG. 5. The combustion vanes 242 and the bypass vanes 244 help to direct the first stream 224 and the second stream 226 through the combustor passageway 238 and the bypass passageway 240, respectively.

The turbine system 218 is coupled with the combustor 216 downstream of the combustor 216 as shown in FIG. 4. The turbine system 218 includes static vanes 246 and rotating blades 248. The static vanes 246 and the rotating blades 248 extend across a turbine flow path 250 through which air flows. The combustion chamber 232 is fluidly coupled with the turbine flow path 250 to deliver the first stream 224 that underwent the combustion reaction to the turbine flow path 250.

The static vanes 246 and the rotating blades 248 are both formed to include cooling air passageways 252 with radially-outwardly facing openings as suggested in FIG. 4. The bypass passageway 240 fluidly couples the compressor 214 with the radially-outwardly facing openings of the cooling air passageways 252 formed in each of the static vanes 246 and the rotating blades 248. The cooling air passageways 252 are shaped to carry cooling air, which includes the second stream 226, therethrough to lower the temperature of the static vanes 246 and the rotating blades 248.

In the alternative embodiment of the gas turbine engine 210, the high pressure ratio feeding the cooling air passageways 252 is done at the tip 230 of the blades 220 with the low pressure ratio near the hub 228 as suggested in FIG. 5. The configuration of the gas turbine engine 210 may be useful where the cooling flow is fed in from the tip of the static turbine vane 246 rather than the hub.

Figure 6:
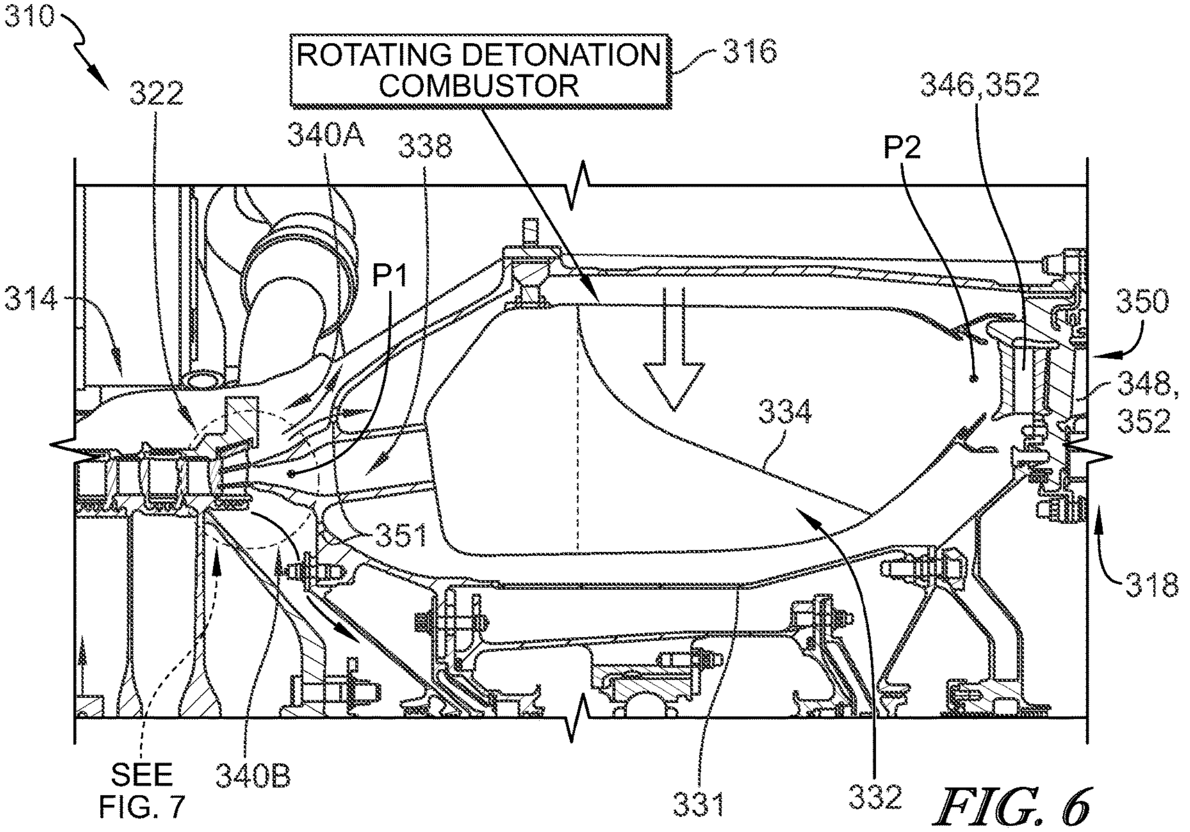
FIG. 6 is a cross-sectional view of a portion of another alternative engine showing that the rotating detonation pressure-gain combustor includes an inlet splitter configured to divide compressed air from the compressor into a first stream that enters the combustion chamber as well as second and third streams radially-inward and radially-outward of the first stream that bypass the combustion chamber to be used for cooling components of the turbine system as suggested in FIG. 7.
Figure 7:
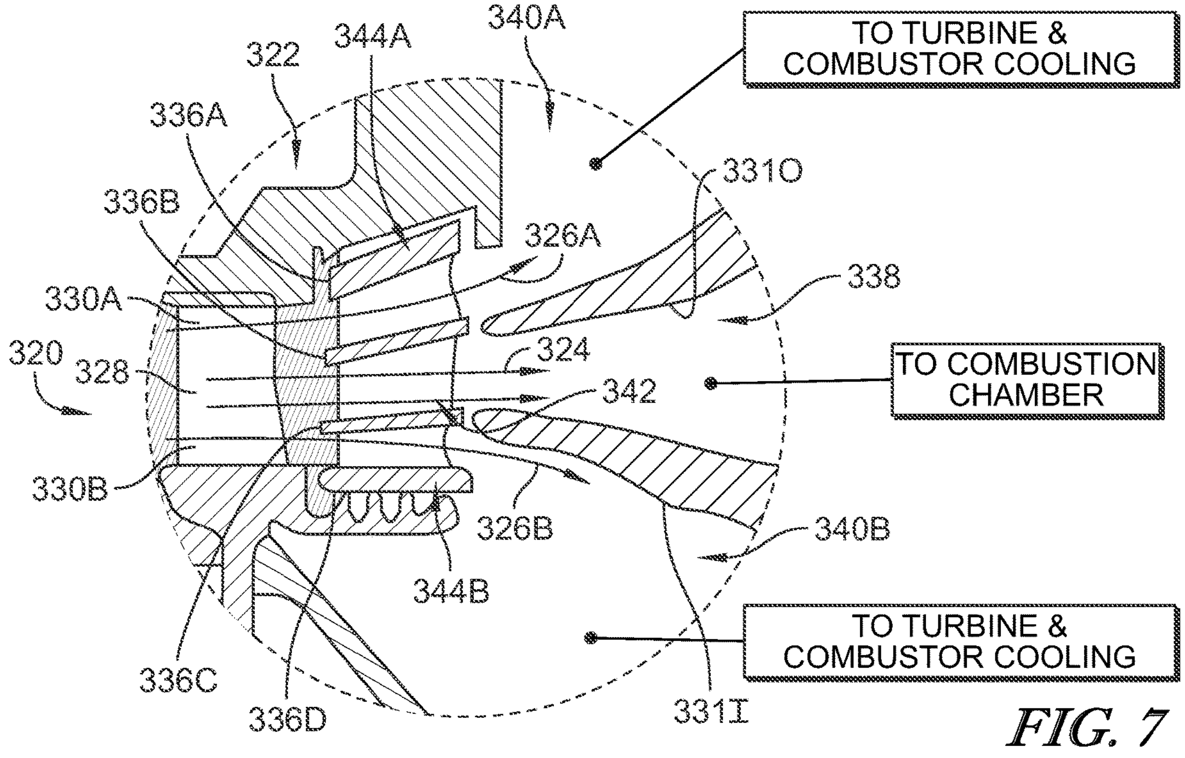
FIG. 7 is a detailed cross-sectional view of a portion of FIG. 6 showing that the inlet splitter of the rotating detonation pressure-gain combustor includes annular rings that define a combustion passageway that provides fluid communication to the combustion chamber and a bypass passageway with radially-inward and -outward portions around the combustion passageway that provide fluid communication to the turbine system for turbine component cooling air.

Another embodiment of a gas turbine engine 310 including a rotating detonation pressure-gain combustor 316 in accordance with the present disclosure is shown in FIGS. 6 and 7. The gas turbine engine 310 is substantially similar to the gas turbine engine 10 shown in FIGS. 1-3 and described herein and the gas turbine engine 210 shown in FIGS. 4 and 5 and described herein. Accordingly, similar reference numbers in the 300 series indicate features that are common between the gas turbine engine 10, the gas turbine engine 210, and the gas turbine engine 310. The descriptions of the gas turbine engine 10 and the gas turbine engine 210 are incorporated by reference to apply to the gas turbine engine 310, except in instances when it conflicts with the specific description and the drawings of the gas turbine engine 310.

The gas turbine engine 310 includes a compressor 314, the rotating detonation pressure-gain combustor 316 located downstream of the compressor 314, and a turbine system 318 located downstream of the rotating detonation pressure-gain combustor 316 as shown in FIG. 6. The compressor 314 includes at least one compressor rotor with at least one compressor blade 320 coupled with the compressor rotor as shown in FIG. 7. The compressor blade 320 is formed to include a combustor portion 328 and two bypass portions 330A, 330B. The combustor portion 328 is radially between the two bypass portions 330A, 330B.

The rotating detonation pressure-gain combustor 316 includes an inlet splitter 322 arranged downstream of the compressor blade 320, a combustor outer shell 331, and a combustion chamber 332 located downstream of the inlet splitter 322 as shown in FIGS. 6 and 7. The inlet splitter 322 is fluidly coupled to the compressor 314. The combustion chamber 332 is in fluid communication with the compressor 314 through the inlet splitter 322 to receive a first stream 324 of the compressed air. Fuel is injected into the combustion chamber 332, mixed with the first stream 324 of the compressed air, and ignited within the combustion chamber 332 so as to induce a rotating detonation wave 334 in the combustion chamber 332 as suggested in FIG. 6.

The inlet splitter 322 includes annular rings 336 arranged circumferentially around a central axis of the gas turbine engine 310 as shown in FIG. 7. The inlet splitter 322 may also be referred to as a compressor discharge vane 322. The annular rings 336 divide the compressed air from the compressor 314 into the first stream 324, a second stream 326A, and a third stream 326B. The first stream 324 flows through a combustor passageway 338 and into the combustion chamber 332. The second stream 326A flows through a first bypass passageway 340A to bypass the combustion chamber 332 and reach the turbine system 318. The third stream 326B flows through a second bypass passageway 340B to bypass the combustion chamber 332 and reach the turbine system 318. The first bypass passageway 340A is arranged radially outward of the combustor passageway 338. As such, the first stream 324 flows radially inward of the second stream 326A. The second bypass passageway 340B is arranged radially inward of the combustor passageway 338. As such, the third stream 326B flows radially inward of the first stream 324 and the second stream 326A.

The annular rings 336 of the inlet splitter 322 include a first annular ring 336A, a second annular ring 336B, a third annular ring 336C, and a fourth annular ring 336D as shown in FIG. 7. The first annular ring 336A is arranged radially outward of the second annular ring 336B, the second annular ring 336B is arranged radially outward of the third annular ring 336C, and the third annular ring 336C is arranged radially outward of the fourth annular ring 336D. The second annular ring 336B is radially aligned with a radially-outward portion 331O of the combustor outer shell 331 as shown in FIG. 7. The third annular ring 336C is radially aligned with a radially-inward portion 331I of the combustor outer shell 331.

The second stream 326A flows radially between the first annular ring 336A and the second annular ring 336B as shown in FIG. 7. The second annular ring 336B and the radially-outward portion 331O of the combustor outer shell 331 define a radial inner boundary of the first bypass passageway 340A.

The first stream 324 flows radially between the second annular ring 336B and the third annular ring 336C as shown in FIG. 7. The second annular ring 336B and the radially-outward portion 331O of the combustor outer shell 331 define a radial outer boundary of the combustor passageway 338. The third annular ring 336C and the radially-inward portion 331I of the combustor outer shell 331 define a radial inner boundary of the combustor passageway 338.

The third stream 326B flows radially between the third annular ring 336C and the fourth annular ring 336D as shown in FIG. 7. The third annular ring 336C and the radially-inward portion 331I of the combustor outer shell 331 define a radial outer boundary of the second bypass passageway 340B.

The second annular ring 336B separates the first bypass passageway 340A and the combustor passageway 338 from one another such that the first stream 324 flows radially inward of the second annular ring 336B and the second stream 326A flows radially outward of the second annular ring 336B as shown in FIG. 7. The third annular ring 336C separates the combustor passageway 338 and the second bypass passageway 340B from one another such that the first stream 324 flows radially outward of the third annular ring 336C and the third stream 326B flows radially inward of the third annular ring 336C.

The combustor passageway 338 fluidly couples the compressor 314 with the combustion chamber 332 as shown in FIG. 6. The first stream 324 passes over the combustor portion 328 of the compressor blade 320, between the second annular ring 336B and the third annular ring 336C, through the combustor passageway 338, and into the combustion chamber 332 of the combustor 316.

The first bypass passageway 340A fluidly couples the compressor 314 with the turbine system 318 to deliver the second stream 326A to the turbine system 318 for cooling of components in the turbine system 318 as suggested in FIG. 6. The second bypass passageway 340B fluidly couples the compressor 314 with the turbine system 318 to deliver the third stream 326B to the turbine system 318 for cooling of components in the turbine system 318.

The second stream 326A passes over the bypass portion 330A of the compressor blade 320, between the first annular ring 336A and the second annular ring 336B, through the first bypass passageway 340A, and into the turbine system 318 as suggested in FIG. 6. The third stream 326B passes over the bypass portion 330B of the compressor blade 320, between the third annular ring 336C and the fourth annular ring 336D, through the second bypass passageway 340B, and into the turbine system 318.

The combustor passageway 338 is arranged radially between the first and second bypass passageways 340A, 340B as shown in FIG. 7. In the illustrative embodiment, the combustor passageway 338 and the first and second bypass passageways 340A, 340B are all annular.

In some embodiments, the combustor outer shell 331 is formed, for example, in the radially-outward portion 331O and the radially-inward portion 331I of the combustor outer shell 331, to include combustor liner cooling passages 351 extending therethrough as shown in FIG. 6. A portion of the second stream 326A flowing through the first bypass passageway 340A may flow through the combustor liner cooling passages 351 formed in the radially-outward portion 331O of the combustor outer shell 331 to cool walls of a combustor liner. A portion of the third stream 326B flowing through the second bypass passageway 340B may flow through the combustor liner cooling passages 351 formed in the radially-inward portion 331I of the combustor outer shell 331 to cool walls of a combustor liner.

The combustor 316 includes combustion vanes 342 arranged across the combustor passageway 338 and bypass vanes 344A, 344B arranged across the first and second bypass passageways 340A, 340B as suggested in FIG. 6. The combustion vanes 342 help to direct the first stream 324 through the combustor passageway 338, and the bypass vanes 344A, 344B help to direct the second stream 326A and the third stream 326B through the first and second bypass passageways 340A, 340B, respectively.

The turbine system 318 is coupled with the combustor 316 downstream of the combustor 316 as shown in FIG. 6. The turbine system 318 includes static vanes 346 and rotating blades 348. The static vanes 346 and the rotating blades 348 extend across a turbine flow path 350 through which air flows. The combustion chamber 332 is fluidly coupled with the turbine flow path 350 to deliver the first stream 324 that underwent the combustion reaction to the turbine flow path 350.

The static vanes 346 and the rotating blades 348 are both formed to include cooling air passageways 352 with radially-outwardly facing openings and radially-inwardly facing openings as suggested in FIG. 6. The first bypass passageway 340A fluidly couples the compressor 314 with the radially-outwardly facing openings of the cooling air passageways 352 formed in each of the static vanes 346 and the rotating blades 348. The second bypass passageway 340B fluidly couples the compressor 314 with the radially-inwardly facing openings of the cooling air passageways 352 formed in each of the static vanes 346 and the rotating blades 348. The cooling air passageways 352 are shaped to carry cooling air, which includes the second stream 326A and the third stream 326B, therethrough to lower the temperature of the static vanes 346 and the rotating blades 348.

Because some turbine static vane 346 arrangements have cooling air delivered both from the tip and the hub, the gas turbine engine 310 includes an additional annular ring 336D as shown in FIG. 7. In such an arrangement, there is a high pressure ratio tip section 330A on the compressor blade 320, a low pressure ratio mid-section 328 on the compressor blade 320 that feeds the combustor 316, and a high pressure ratio hub section 330B on the compressor blade 320.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:

a compressor including at least one compressor rotor with a compressor blade configured to compress air drawn into the gas turbine engine upon rotation of the compressor rotor, a rotating detonation combustor arranged around a reference axis, the rotating detonation combustor including a combustion chamber and an inlet splitter fluidly coupled to the compressor to receive compressed air from the compressor and to the combustion chamber, the rotating detonation combustor configured to mix fuel with compressed air in the combustion chamber, ignite the mixed fuel and compressed air in the combustion chamber, and to discharge products of the combustion reaction between the mixed fuel and the compressed air at a discharge pressure greater than an inlet pressure of the compressed air received from the compressor, a turbine system that defines a flow path across which static vanes and rotating blades extend, the flow path fluidly coupled to the rotating detonation combustor so as to receive products of the combustion reaction from the rotating detonation combustor, and the static vanes and rotating blades formed to include cooling air passageways shaped to carry cooling air therethrough to lower the temperature of the associated static vanes and rotating blades, wherein the inlet splitter of the rotating detonation combustor is shaped to include a combustion passageway that fluidly couples the compressor with the combustion chamber and a bypass passageway separated from the combustion chamber that fluidly couples the compressor with the cooling air passageways formed in the static vanes and rotating blades, and wherein the compressor includes a compressor airfoil upstream of the inlet splitter of the rotating detonation combustor, and wherein the compressor airfoil has a combustor portion upstream of the combustion passageway shaped to compress air directed to the combustion passageway and a bypass portion shaped to compress air directed to the bypass passageway, and wherein the bypass portion of the compressor airfoil is shaped to increase pressure of compressed air directed to the bypass passageway more than the combustor portion of the compressor airfoil.

2. The gas turbine engine of claim 1, wherein the inlet splitter includes an annular ring separating the combustion passageway from the bypass passageway.

3. The gas turbine engine of claim 2, wherein the inlet splitter includes combustion airfoils arranged across the combustion passageway and bypass airfoils arranged across the bypass passageway.

4. The gas turbine engine of claim 3, wherein the number of combustion airfoils is different from the number of bypass airfoils.

5. The gas turbine engine of claim 3, wherein the bypass airfoils are shaped to increase static pressure downstream of the inlet splitter more than the combustion airfoils.

6. The gas turbine engine of claim 1, wherein the bypass passageway includes (i) a radially-inner portion that is shaped to fluidly couple the compressor with radially-inwardly facing openings into at least one of the cooling air passageways, and (ii) a radially-outer portion that is shaped to interconnect the compressor with radially-outwardly facing openings into at least one of the cooling air passageways.

7. The gas turbine engine of claim 6, wherein the inlet splitter includes an inner ring that separates the combustion passageway from the radially-inner portion of the bypass passageway and an outer ring that separates the combustion passageway from the radially-outer portion of the bypass passageway.

8. The gas turbine engine of claim 1, wherein the combustor passageway of the inlet splitter included in the rotating detonation combustor is annular, the bypass passageway of the inlet splitter included in the rotating detonation combustor is annular, and the bypass passageway is radially separated from the combustor passageway.

9. The gas turbine engine of claim 8, wherein the bypass passageway of the inlet splitter is radially inward of the combustor passageway.

10. The gas turbine engine of claim 8, wherein the bypass passageway of the inlet splitter is radially outward of the combustor passageway.

11. A gas turbine engine comprising:

a compressor configured to compress air drawn into the gas turbine engine, a turbine system including static vanes and rotating blades formed to include cooling air passageways, a pressure-gain combustor fluidly coupled between the compressor and the turbine system, the pressure-gain combustor including a combustion chamber and an inlet splitter, wherein the inlet splitter of the pressure-gain combustor is shaped to include a combustion passageway that fluidly couples the compressor with the combustion chamber and a bypass passageway that fluidly couples the compressor with the cooling air passageways formed in the static vanes and rotating blades included in the turbine system, wherein the compressor includes a compressor airfoil upstream of the inlet splitter of the rotating detonation combustor, the compressor airfoil has a combustor portion upstream of the combustion passageway configured to compress air directed to the combustion passageway and a bypass portion configured to compress air directed to the bypass passageway, and the bypass portion of the compressor airfoil is shaped to increase pressure of compressed air directed to the bypass passageway more than the combustor portion of the compressor airfoil.

12. The gas turbine engine of claim 11, wherein the inlet splitter of the pressure-gain combustor includes a wall that separates the combustion passageway from the bypass passageway.

13. The gas turbine engine of claim 12, wherein the wall comprises an annular ring separating the combustion passageway from the bypass passageway.

14. The gas turbine engine of claim 13, wherein the inlet splitter includes combustion airfoils arranged across the combustion passageway and bypass airfoils arranged across the bypass passageway.

15. The gas turbine engine of claim 14, wherein the number of combustion airfoils is different from the number of bypass airfoils.

16. The gas turbine engine of claim 14, wherein the bypass airfoils are shaped to increase static pressure downstream of the inlet splitter more than the combustion airfoils.

* * * * *